(12) United States Patent
Horn et al.

(10) Patent No.: US 12,317,273 B2
(45) Date of Patent: May 27, 2025

(54) RELIABLE DELIVERY OF SYSTEM INFORMATION

(71) Applicant: QUALCOMM Incorporated, San Diego, CA (US)

(72) Inventors: Gavin Bernard Horn, La Jolla, CA (US); Shailesh Maheshwari, San Diego, CA (US); Vanitha Aravamudhan Kumar, San Diego, CA (US); Madhup Chandra, San Diego, CA (US); Linhai He, San Diego, CA (US)

(*) Notice: Subject to any disclaimer, the term of this patent is extended or adjusted under 35 U.S.C. 154(b) by 244 days.

(21) Appl. No.: 15/905,425

(22) Filed: Feb. 26, 2018

(65) Prior Publication Data

US 2018/0288748 A1   Oct. 4, 2018

Related U.S. Application Data

(60) Provisional application No. 62/480,290, filed on Mar. 31, 2017.

(51) Int. Cl.
  *H04L 1/18*   (2023.01)
  *H04W 48/12*   (2009.01)
  (Continued)

(52) U.S. Cl.
  CPC ........... *H04W 72/23* (2023.01); *H04L 1/18* (2013.01); *H04W 48/12* (2013.01);
  (Continued)

(58) Field of Classification Search
  CPC ........ H04L 1/18; H04W 48/12; H04W 48/14; H04W 72/042; H04W 72/0446; H04W 74/0833
  See application file for complete search history.

(56) References Cited

U.S. PATENT DOCUMENTS

2009/0011786 A1* 1/2009 Lee ..................... H04W 52/325
                                                                        455/522
2012/0063370 A1* 3/2012 Worrall ................. H04W 48/12
                                                                        370/280
(Continued)

FOREIGN PATENT DOCUMENTS

CN          1135123 A      11/1996
CN        101595747 A      12/2009
(Continued)

OTHER PUBLICATIONS

International Search Report and Written Opinion—PCT/US2018/019872—ISA/EPO—May 14, 2018.
(Continued)

*Primary Examiner* — Syed Ali

(57) ABSTRACT

Certain aspects of the present disclosure relate to methods and apparatus for reliable transmission of system information (SI). In some cases, a UE may send an indication to request SI in an on-demand manner. For example, a method for wireless communications by a UE may include determining system information (SI) desired by the UE is not currently being broadcast. The method for further include sending, in response to the determination, a first indication to request the SI, and sending a second indication to confirm reception of the requested SI or to indicate the UE has not received the requested SI after a time period.

20 Claims, 12 Drawing Sheets

(51) Int. Cl.
*H04W 72/0446* (2023.01)
*H04W 72/23* (2023.01)
*H04L 1/00* (2006.01)
*H04L 1/1867* (2023.01)
*H04W 48/14* (2009.01)
*H04W 74/0833* (2024.01)

(52) U.S. Cl.
CPC . *H04W 72/0446* (2013.01); *H04L 2001/0093* (2013.01); *H04L 1/1896* (2013.01); *H04W 48/14* (2013.01); *H04W 74/0833* (2013.01)

(56) References Cited

U.S. PATENT DOCUMENTS

| | | | |
|---|---|---|---|
| 2013/0021932 A1* | 1/2013 | Damnjanovic ... | H04W 52/0209 370/252 |
| 2013/0279377 A1 | 10/2013 | Zhao et al. | |
| 2014/0044105 A1* | 2/2014 | Bontu ............ | H04W 24/10 370/336 |
| 2014/0045509 A1* | 2/2014 | Parr ............... | H04W 76/10 455/450 |
| 2015/0016312 A1* | 1/2015 | Li ................. | H04W 74/006 370/280 |
| 2015/0038152 A1* | 2/2015 | Yang .............. | H04W 76/18 455/450 |
| 2015/0085717 A1* | 3/2015 | Papasakellariou .... | H04W 48/12 370/280 |
| 2015/0092740 A1* | 4/2015 | Li ................. | H04L 1/08 370/329 |
| 2015/0223258 A1* | 8/2015 | Jung ............. | H04W 48/12 455/452.1 |
| 2016/0219614 A1* | 7/2016 | Webb ............ | H04W 72/1268 |
| 2016/0234735 A1 | 8/2016 | Kubota et al. | |
| 2016/0234736 A1* | 8/2016 | Kubota .......... | H04W 36/0083 |
| 2017/0318478 A1* | 11/2017 | Basu Mallick ... | H04L 5/0091 |
| 2018/0019839 A1* | 1/2018 | Chen ............. | H04W 48/10 |
| 2018/0132168 A1* | 5/2018 | Ingale ........... | H04W 48/12 |
| 2018/0167918 A1* | 6/2018 | Ishii ............. | H04W 72/042 |
| 2018/0220288 A1* | 8/2018 | Agiwal .......... | H04W 48/08 |
| 2018/0270855 A1* | 9/2018 | Loehr ............ | H04L 1/189 |
| 2018/0270865 A1* | 9/2018 | Mallick ......... | H04W 74/0833 |
| 2018/0270866 A1* | 9/2018 | Loehr ............ | H04W 72/23 |
| 2018/0279377 A1* | 9/2018 | Lin ............... | H04L 5/0055 |
| 2018/0302844 A1* | 10/2018 | Liu ................ | H04W 48/10 |
| 2018/0323908 A1* | 11/2018 | Chou ............. | H04W 48/14 |
| 2018/0343572 A1* | 11/2018 | Basu Mallick ... | H04W 24/02 |
| 2019/0007893 A1* | 1/2019 | Thangarasa ..... | H04W 4/70 |
| 2019/0069220 A1* | 2/2019 | Kim .............. | H04L 27/2613 |
| 2019/0104477 A1* | 4/2019 | MolavianJazi ... | H04W 52/10 |
| 2019/0159110 A1* | 5/2019 | Takahashi ...... | H04W 48/10 |
| 2019/0174554 A1* | 6/2019 | Deenoo ......... | H04W 72/0453 |
| 2019/0268852 A1* | 8/2019 | Ryu .............. | H04W 74/0833 |
| 2019/0350039 A1* | 11/2019 | June ............. | H04W 72/23 |
| 2019/0356461 A1* | 11/2019 | Lei ............... | H04L 5/0094 |
| 2020/0015266 A1* | 1/2020 | Yan .............. | H04W 74/0833 |
| 2020/0084704 A1* | 3/2020 | Agiwal ......... | H04W 72/23 |
| 2020/0154481 A1* | 5/2020 | Goto ............. | H04W 28/04 |
| 2021/0119727 A1* | 4/2021 | Chen ............ | H04W 92/10 |
| 2022/0256570 A1* | 8/2022 | Park ............. | H04L 5/0051 |

FOREIGN PATENT DOCUMENTS

| | | |
|---|---|---|
| CN | 105637842 A | 6/2016 |
| CN | 106471765 A | 3/2017 |
| EP | 2761955 A1 | 8/2014 |
| WO | 2016130353 A2 | 8/2016 |

OTHER PUBLICATIONS

Samsung: "System Information Signalling Design in NR", 3GPP Draft; R2-163371 System Information SignalingDesign in NR, 3rd Generation Partnership Project (3GPP), Mobile Competence Centre, 650, Route Des Lucioles; F-06921 Sophia-Antipolis Cedex, France, vol. RAN WG2, Nanjing, China; May 23, 2016-May 27, 2016, May 22, 2016 (May 22, 2016), XP051104902, Retrieved from the Internet: URL: http://www.3gpp.org/ftp/Meetings_3GPP_SYNC/RAN2/Docs/ [retrieved on May 22, 2016].

Cai X.Y., et al., "Techniques of Probing Remote Operating Systems based on TCP", System Engineering and Electronic Technology, Sep. 20, 2006, vol. 28, No. 9, 5 pages.

Ericsson: "Introduction of Low Complexity UE and Enhanced Coverage Features", 3GPP TSG-WG2 Meeting #93, R2-161777 St. Julian's, Malta, Feb. 15-19, 2016, 27 Pages.

Samsung: "On Demand SI Delivery: Signaling Aspects" [online], 3GPP Draft, 3GPP TSG-RAN WG2 NR, R2-1700011, Spokane, USA, Jan. 17-19, 2017, 5 Pages, Retrieved from the Internet: URL: http://www.3gpp.org/ftp/tsg_ran/WG2_RL2/TSGR2_AHs/2017_01_NR/Docs/R2-1700011.zip.

Taiwan Search Report—TW107106534—TIPO—Jun. 3, 2021.
Taiwan Search Report—TW107106534—TIPO—Feb. 22, 2022.

* cited by examiner

RELIABLE DELIVERY OF SYSTEM INFORMATION

CLAIM OF PRIORITY UNDER 35 U.S.C. § 119

The present application for patent claims benefit of U.S. Provisional Patent Application Ser. No. 62/480,290, filed Mar. 31, 2017, assigned to the assignee hereof and hereby expressly incorporated by reference herein.

BACKGROUND

Field of the Disclosure

The present disclosure relates generally to wireless communication systems, and more particularly, to methods and apparatus for reliable delivery of system information in such systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment. The method generally includes determining system information (SI) desired by the UE is not currently being broadcast, sending, in response to the determination, a first indication to request the system information (SI), and sending a second indication to confirm reception of the requested SI or to indicate the UE has not received the requested SI after a time period.

Certain aspects provide a method for wireless communications by a base station. The method generally includes receiving, from one more user equipments, a first indication as a request for system information (SI), transmitting the SI in response to the first indication, monitoring for a second indication to confirm reception of the requested SI by the one or more UEs or to determine that at least one of the one or more UEs has not received the requested SI after a time period, and deciding whether to continue transmitting the SI based on the monitoring.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
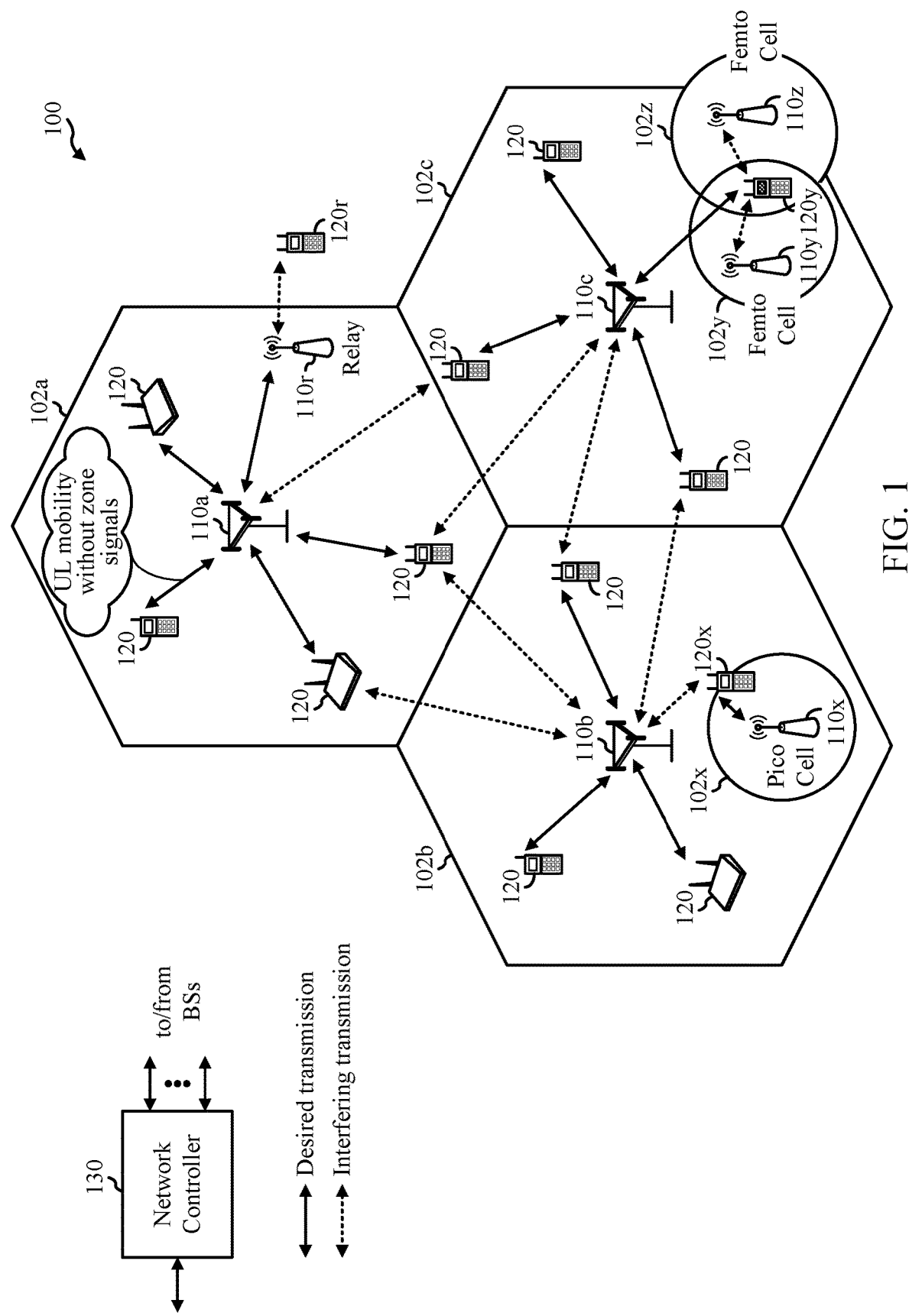
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity (DC), but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
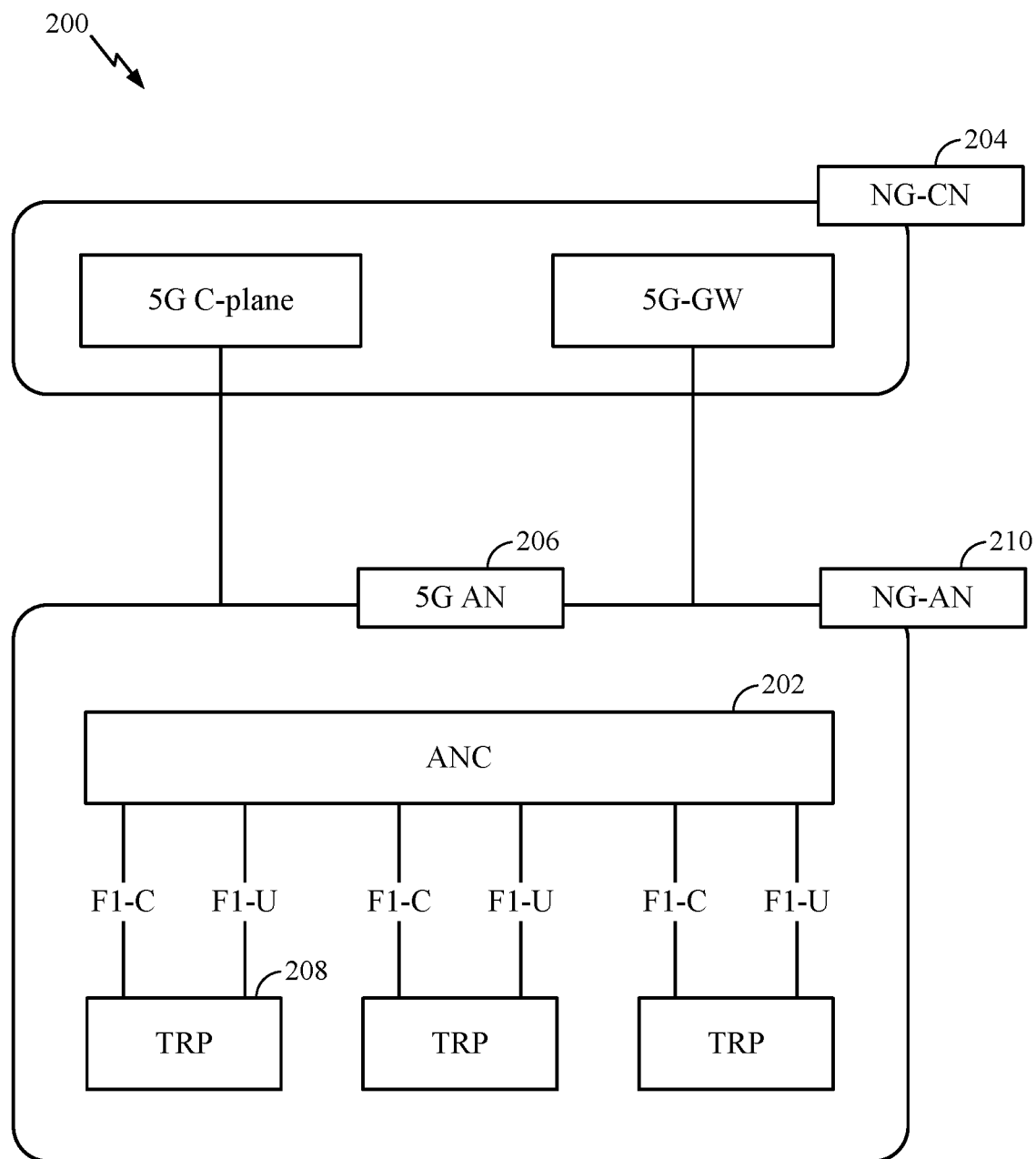
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more transmitters, receivers, and/or antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
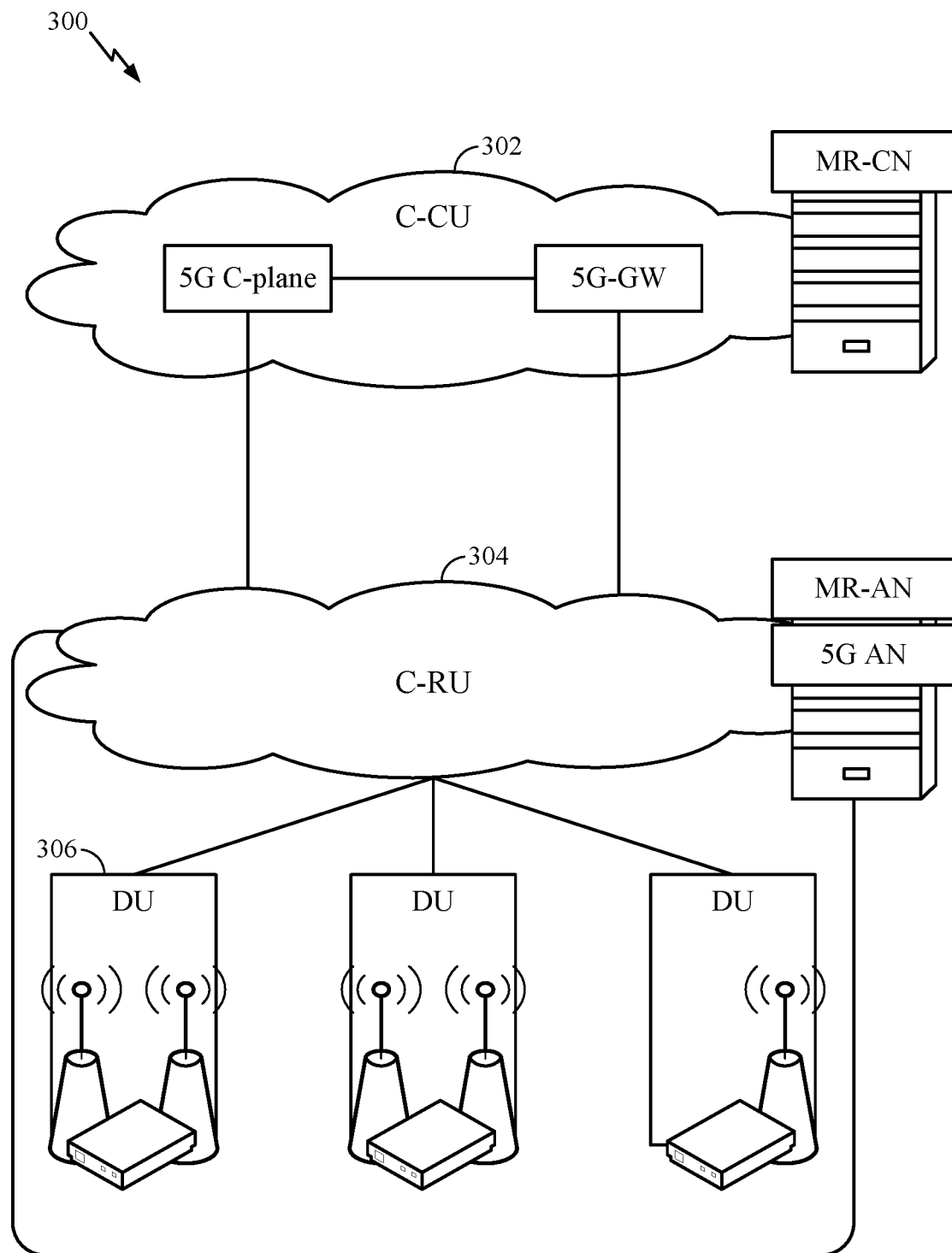
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
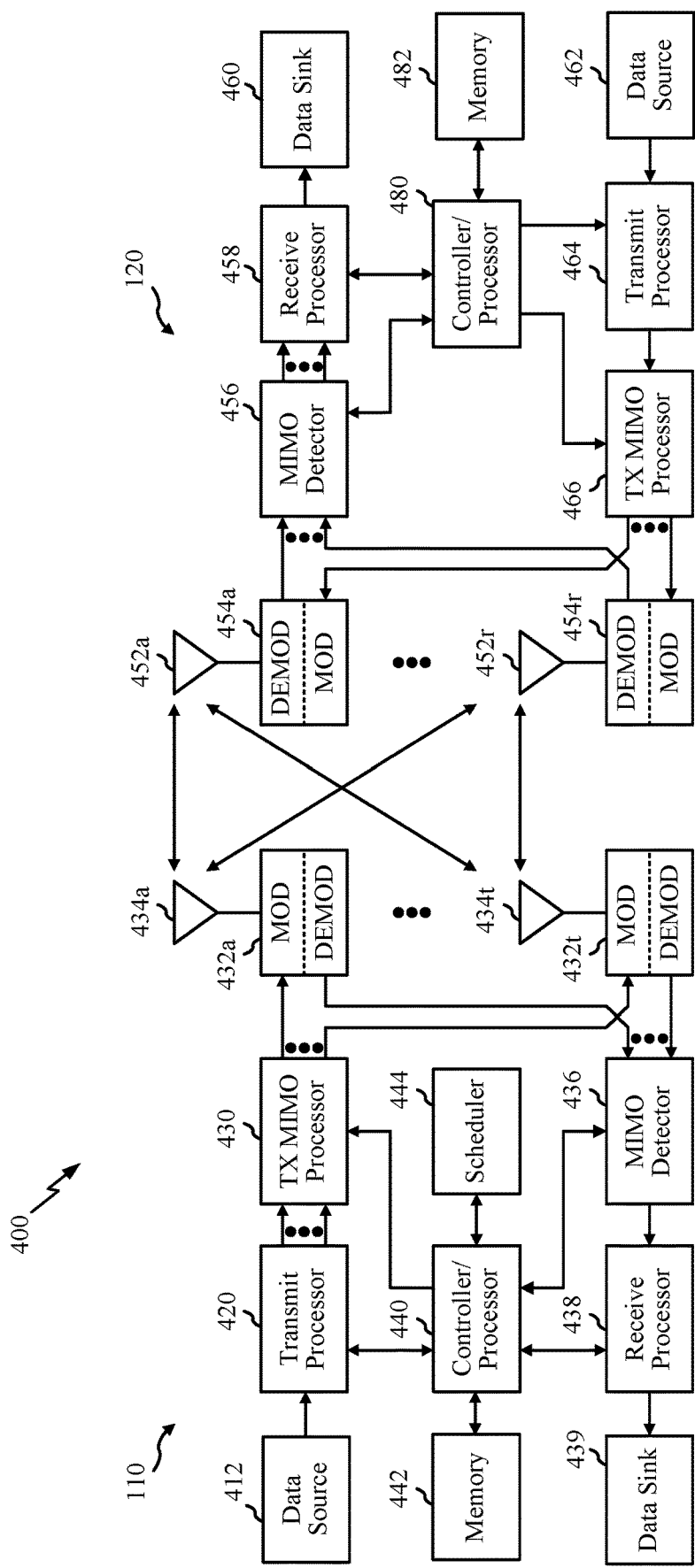
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12 and 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
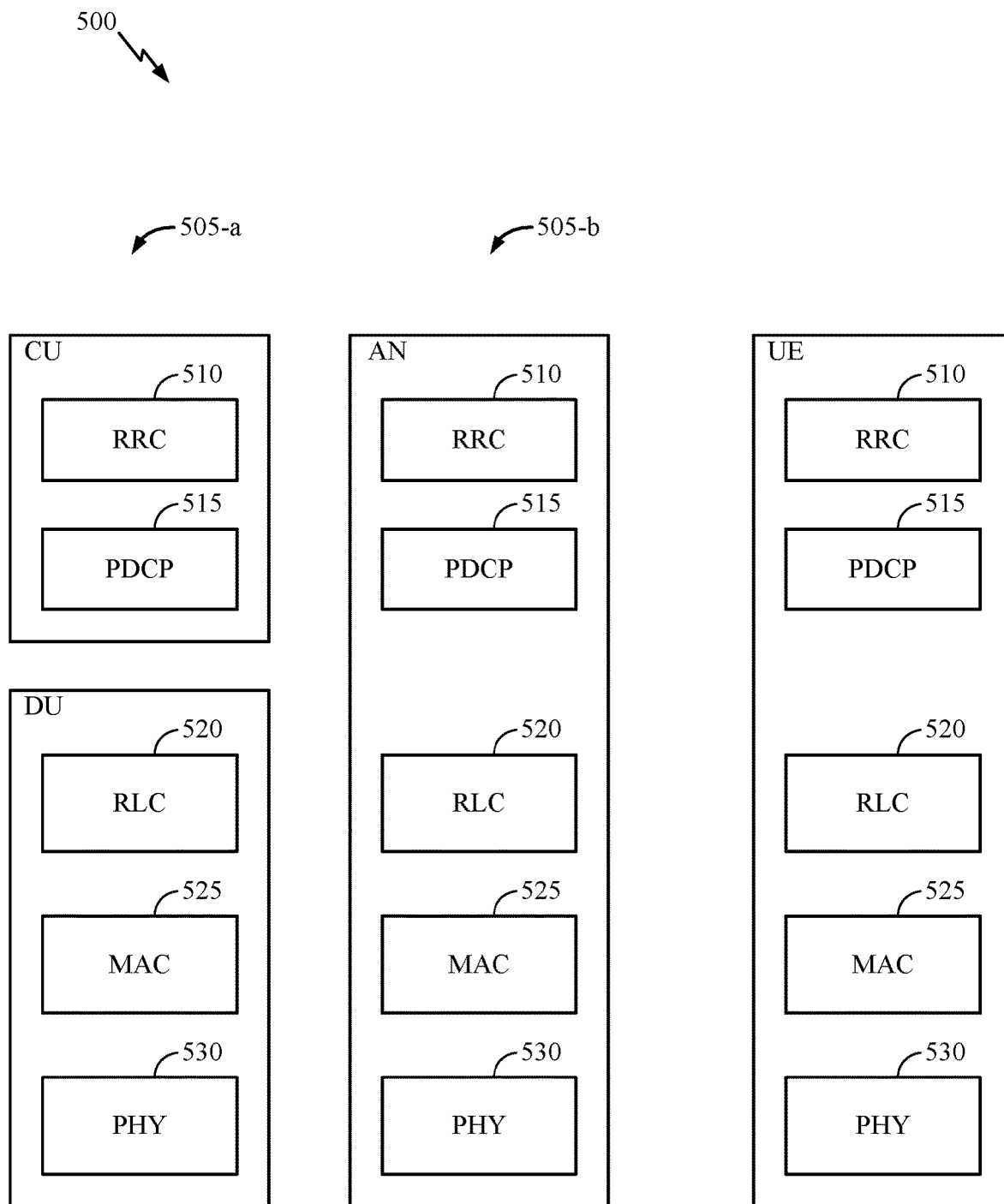
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
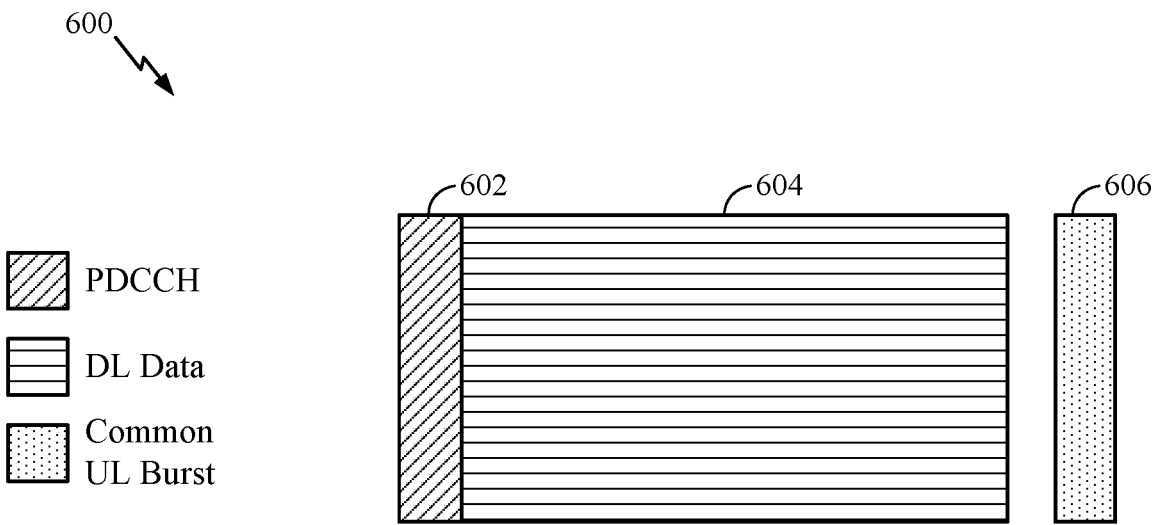
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
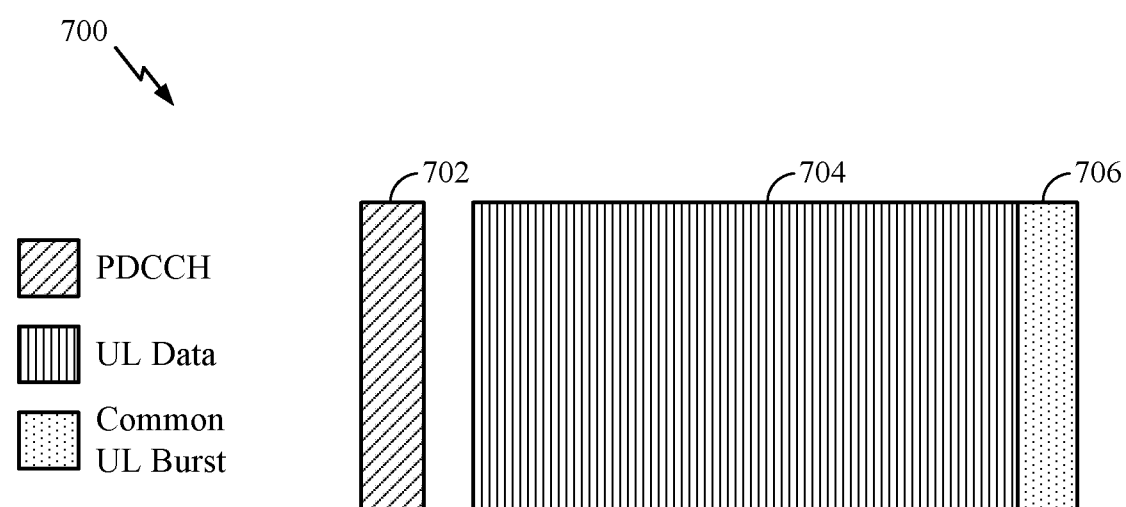
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Reliable Delivery of System Information

In current wireless network deployments (e.g., LTE), system information, which provides system configuration parameters for a cell, may be grouped into multiple system information blocks (SIBs) and periodically broadcast by eNBs. The schedule of these broadcasts may be included in a reduced size information block, referred to as minimum system information message (miniSI), which may also be broadcast periodically. In such systems, a UE new to a cell first obtains system information before the UE is able to connect to that cell.

One potential drawback of this current design is that this broadcast of system information may not be adaptive, which may result in a waste of system resources. For example, if there is no UE in the cell that needs system information, SIBs are still broadcast and those transmissions are wasted. For this reason, it may be desirable to keep the period of SIB broadcasts from being too short, as it may increase system overhead. A potential downside of this feature is that it may increase latency in the UEs that are obtaining system information for connecting to a cell. This increased latency may be undesirable, particularly in use cases where UEs are attempting to make connections to the new cell as quickly as possible.

Aspects of the present disclosure, however, provide a solution to this drawback by making system information on-demand. As will be described in greater detail below, using this on-demand approach, SIBs may not be sent unless the SIBs are requested by one or more UEs. This on-demand approach of delivering SIBs reliably to UEs may be beneficial, particularly in the case where UEs are not yet connected to a network.

Figure 8:
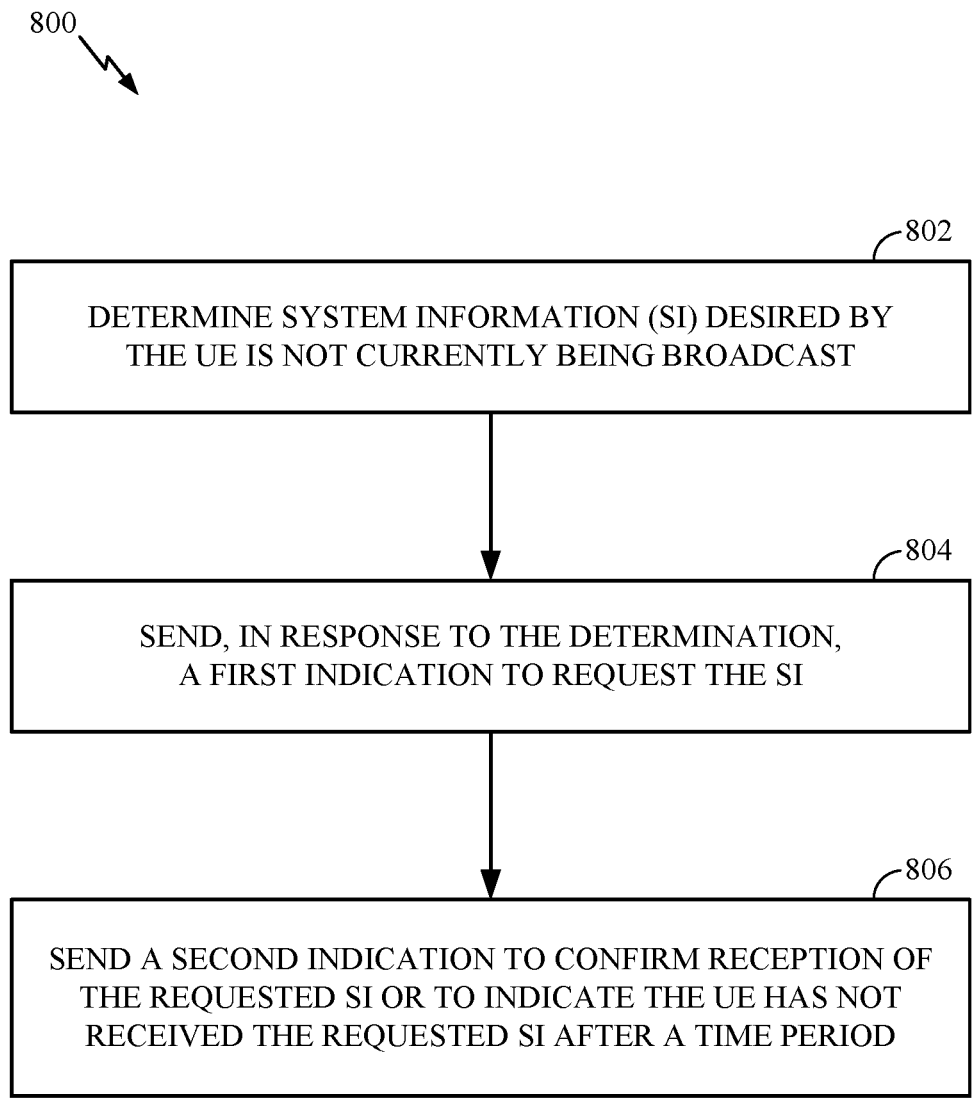
FIG. 8 illustrates example operations for wireless communications by a user equipment (UE), in accordance with aspects of the present disclosure.

FIG. 8 illustrates example operations 800 for wireless communications in accordance with aspects of the present disclosure. Operations 800 may be performed, for example, by a UE to request on-demand delivery of SIBs.

Operations 800 begin, at 802, by determining system information (SI) desired by the UE is not currently being broadcast. At 804, in response to the determination, the UE sends a first indication to request the system information (SI). At 806, the UE sends a second indication to confirm reception of the requested SI or to indicate the UE has not received the requested SI after a time period.

In some cases, the time period corresponds to a configured number of attempts to receive the SI based on expected instances of transmissions of the SI in response to the first indication. Additionally, receiving signaling indicating the number of attempts may also be provided. In one or more cases, if the second indication is to confirm reception of the requested SI, the second indication may be sent as a positive acknowledgment (ACK) on a physical uplink control channel (PUCCH) or a designated RACH transmission. In some cases, the first indication may be sent via a designated random access channel (RACH) transmission. In some cases, another operation that may be provided includes receiving signaling, in a broadcast message, indicating when the requested SI will be transmitted.

Figure 9:
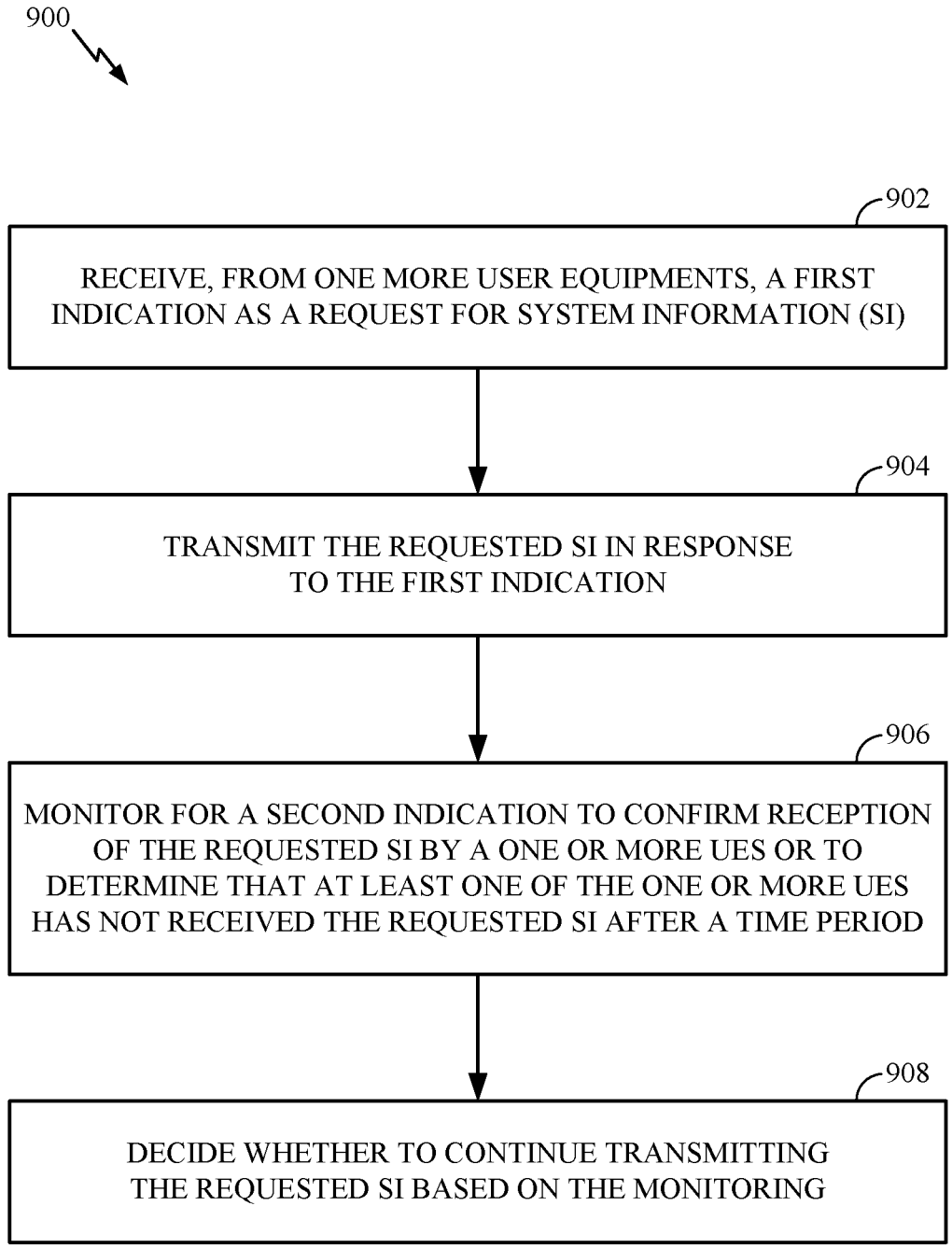
FIG. 9 illustrates example operations for wireless communications by a base station, in accordance with aspects of the present disclosure.

FIG. 9 illustrates example operations 900 for wireless communications in accordance with aspects of the present disclosure. Operations 900 may be performed, for example, by a base station for on-demand delivery of SIBs to a UE (e.g., a UE performing operations 800 described above).

Operations 900 begin, at 902, by receiving, from one or more user equipments, a first indication as a request for system information (SI). At 904, the base station transmits the SI in response to the first indication. At 906, the base station monitors for a second indication to confirm reception of the requested SI by the one or more UEs or to determine that at least one of the one or more UEs has not received the requested SI after a time period. At 908, the base station decides whether to continue transmitting the SI based on the monitoring.

In some cases, the time period may correspond to a configured number of transmissions of the SI. In some cases, the transmissions occur in pre-scheduled subframes. In some cases, the operation of transmitting signaling indicating the number of attempts may be included. In some cases, the operations of initializing a counter with the configured number of transmissions, and decrementing the counter with each SI transmission, wherein the deciding whether to continue transmitting the SI is based on the counter may be included.

In some cases, the deciding operation may further include deciding to stop transmissions of the SI if the counter reaches zero. In some cases the deciding operation may include deciding to stop transmissions of the SI before the counter reaches zero if each of the one or more UEs has positively acknowledged receiving the requested SI. Further, the operations may additionally include re-initializing the timer if the network entity receives a negative acknowledgment (NACK) from at least one of the one or more UEs has not received the requested SI. In some case, the second indication may be sent via at least one of a designated random access channel (RACH) transmission or a physical uplink control channel (PUCCH) transmission In accordance with the on-demand approach described herein, when a UE wants to receive ("download") a SIB, the UE sends a request to the gNB. In some cases, this request may include information regarding which SIB is requested. In some cases, the request may also include an identifier (ID) of the UE-which may help a gNB keep track of which UEs have requested (and subsequently acknowledged) SIBs.

When a gNB receives an on-demand request, the gNB may send the requested SIB. There are various options for determining when the SIB is sent. According to a first option, the gNB may send the SIB once the gNB receives and processes the request. In this manner, the delay between the time when the UE sent the request and the time when the gNB first transmits the SIB may be fixed (and known to the UE). As a result, the UE knows when to expect the first transmission of its requested SIB. This knowledge may allow the UE to determine, for example, when to send a negative acknowledgment (NACK) or request re-transmission of a requested SIB.

According to a second option, the gNB may broadcast SIBs in pre-scheduled subframes only, if/when requested. The pre-scheduled subframes, for example, may comprise a window of subframes where the on-demand SIB transmission instances may occur. The window may cover a single instance in a single subframe or a range of subframes, for example, for unlicensed spectrum where the medium may not be guaranteed to be available in a particular subframe.

In general, using pre-schedule subframes, a SIB is not broadcast if no request for the SIB is received before the SIB's scheduled time. Otherwise, the gNB may respond to all the received requests only at the next scheduled time for that SIB. The broadcast schedule of each (different type of)

SIB may be advertised in the miniSI. With knowledge of the schedule(s), a UE may calculate when the UE can expect to receive a SIB if the UE requests the SIB.

In some cases, a gNB may keep track of the set of UEs which have sent the requests. For example, as described below, a gNB may stop transmitting a SIB if all UEs that requested that SIB have acknowledged receipt of that SIB (or none of the UEs have negatively acknowledged receipt).

Figure 10:
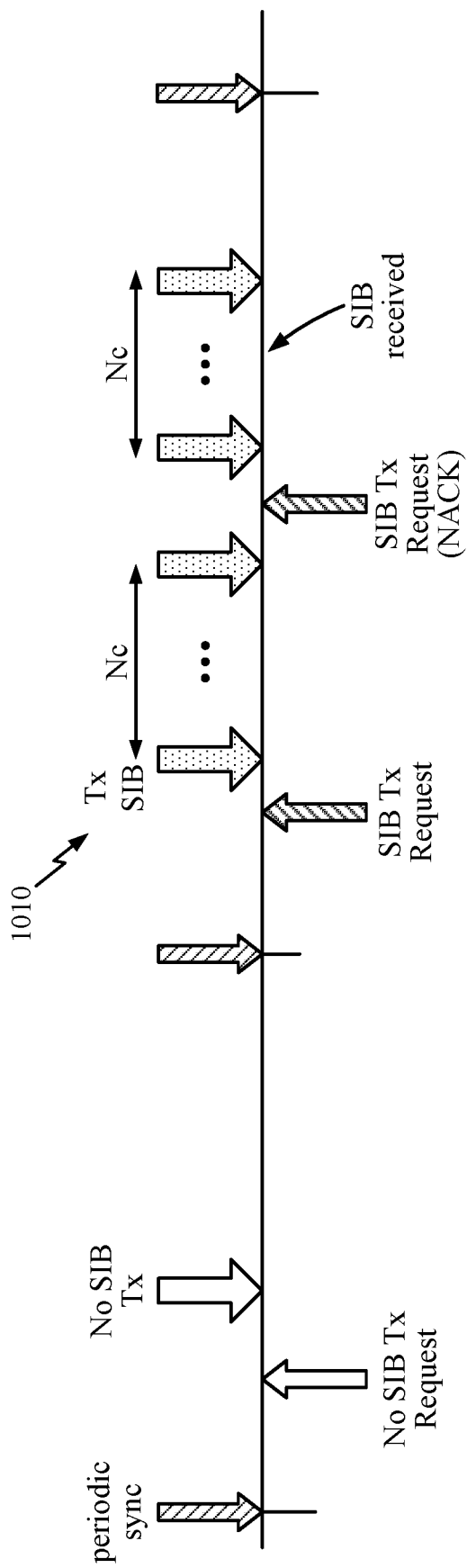
FIG. 10 illustrates one approach for reliable delivery of system information, in accordance with aspects of the present disclosure.

After sending a request, the UE tries to receive the SIB at its expected transmission time, as described above. There are various options of what may be done to help ensure successful reception of the SIB by a gNB. According to one option, as illustrated in FIG. 10, on the gNB side, after the first broadcast of the SIB, at 1010, the gNB starts a counter with an initial value of Nc and repeats broadcasting the SIB. The counter may be decremented by one after each broadcast. When the counter reaches zero, the gNB stops broadcasting the SIB. Nc may be advertised in the miniSI and, hence, may be known to UEs. In some cases, whenever the gNB receives a NACK (e.g., from any UE requesting the SIB), the gNB may reset (re-initialize) the retransmission counter to Nc. On the UE side, if the UE successfully receives the SIB, the UE may not need to take further action. On the other hand, if the UE does not receive the SIB after Nc number of consecutive attempts, the UE may send a negative acknowledgment (NACK) to the gNB. NACKs may be sent, for example, via a special random access channel (RACH) preamble or message or via a physical uplink control channel (PUCCH). This process may be repeated until UE successfully receives the SIB.

Figure 11:
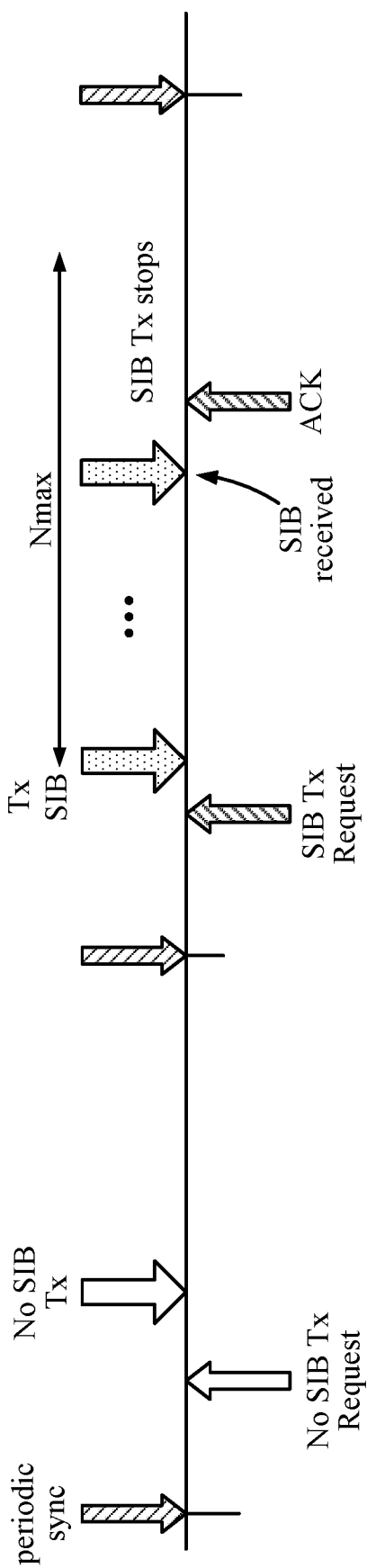
FIG. 11 illustrates one approach for reliable delivery of system information, in accordance with aspects of the present disclosure.

According to another option, illustrated in FIG. 11, if the UE successfully receives the SIB, the UE sends an ACK to the gNB and that completes the UE side of the on-demand delivery procedures. ACKs may be sent, for example, via a special random access channel (RACH) preamble or message or via a physical uplink control channel (PUCCH). This process may be repeated until UE successfully receives the SIB. Otherwise, the UE may continue to try and receive the SIB again at the next expected transmission time of the SIB. On the network side, the gNB may keep broadcasting the SIB. At the same time, the gNB may keep track of the set of UEs which have sent in ACKs. The gNB may stop broadcasting the SIB if the gNB has received ACKs from all the UE which have sent the request.

In some cases, there may be collisions between UEs sending ACKs over PUCCH at the same time. This may cause a gNB to keep sending SIBs without a stop, if the gNB is unable to detect collisions and UEs send ACK only once. To avoid such a case, the gNB may stop broadcasting after Nmax number of repetitions, even if the gNB has not received ACKs from all the UEs. This Nmax may be advertised in the miniSI, so that if the UE does not receive the SIB after Nmax number of attempts, the UE should resend its request.

As noted above, there are different implementation options for the messages described herein (e.g., a request for on-demand SIBs, NACK and ACK). For actual implementation, for any given deployment, a network (operator) may choose to use any combination of the options described herein, together with any of the delivery options described above, to achieve reliable delivery of SIBs. In some cases, the particular configuration may be advertised in the miniSI, so that UEs know how to perform their procedures accordingly.

In some cases, for an on-demand SIB request, a UE may send a special preamble on the random-access channel (RACH). In addition, a request for a SIB may be sent in a designated RACH time slot for that SIB (e.g., slot 1 is for SIB3, slot 5 for SIB4, and the like), so that a gNB knows which SIB is being requested when the gNB receives this special preamble. In some cases, a request may be sent in the so-called Message 3, assuming a regular two-step or four-step RACH procedure. In such cases, the UE may indicate in the Message 3 which SIB the UE is requesting.

In some cases, a UE may signal a NACK by sending a special RACH preamble. As a gNB may not need to know which UE has sent this NACK (and may reset its counter if any UE sends a NACK), this special preamble may be sent in any RACH time slot. In some cases, a NACK may be sent using the same message as the original request (e.g., a NACK effectively serves as another request for an on-demand SIB). In use cases where strict timing advancement may not be required, a special PUCCH resource may be configured for the purpose of sending a NACK to the gNB. This resource and its period may be advertised in the miniSI. The corresponding PUCCH format may be defined to include information on which SIB this NACK is for.

In some cases, a UE may signal an ACK in the Message 3 in a regular two-step or four-step RACH procedure. The UE may indicate in the Message 3 that it is an ACK. As noted above, such an ACK may also include a UE ID and information on which SIB the ACK is for. In use cases where strict timing advancement may not be required, a special PUCCH resource may be configured for the purpose of sending an ACK to the gNB. This resource and its period may be advertised in the miniSI. The corresponding PUCCH format may be defined to include the UE ID and information on which SIB this NACK is for. As noted above, because collision may occur when multiple UEs use this PUCCH resource at the same time, extra steps described above may be taken when this option is used (to avoid or at least account for collisions).

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 8A:
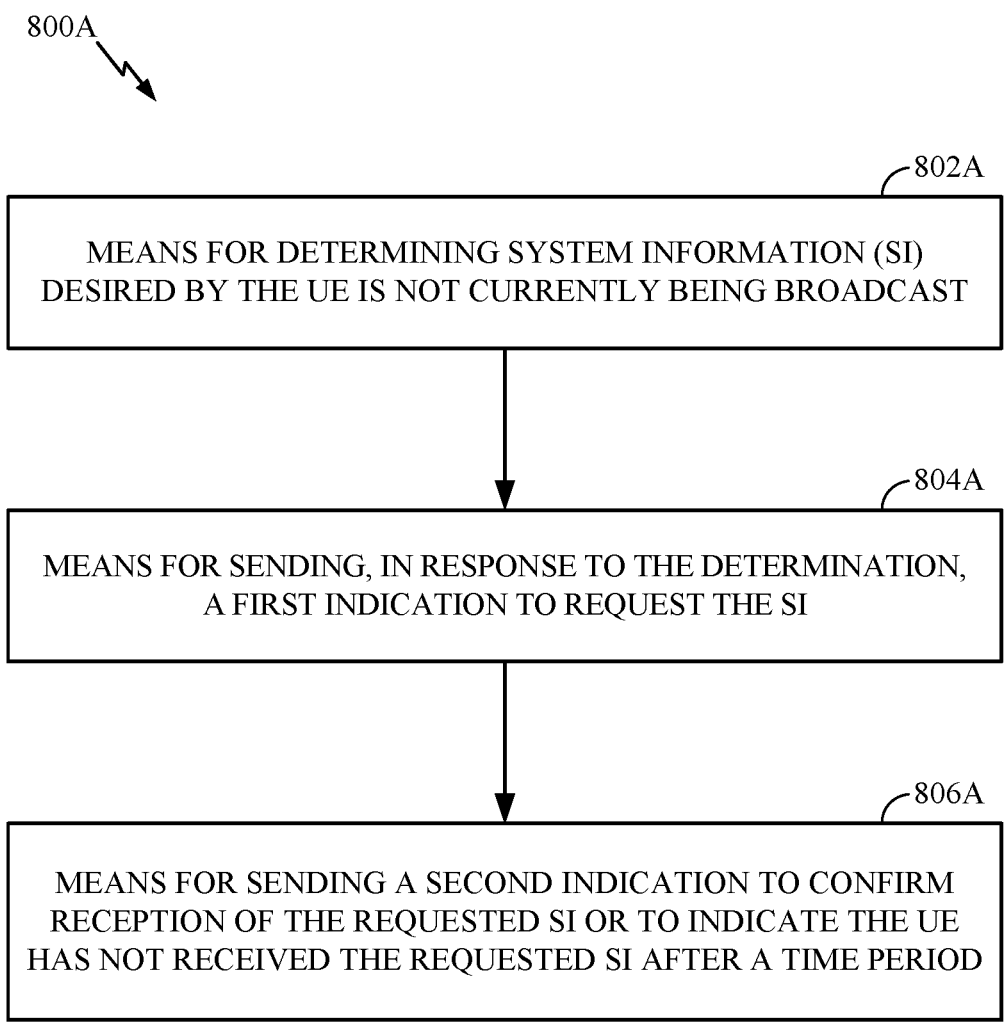
FIG. 8A illustrates example components capable of performing the operations shown in FIG. 8, in accordance with aspects of the present disclosure.
Figure 9A:
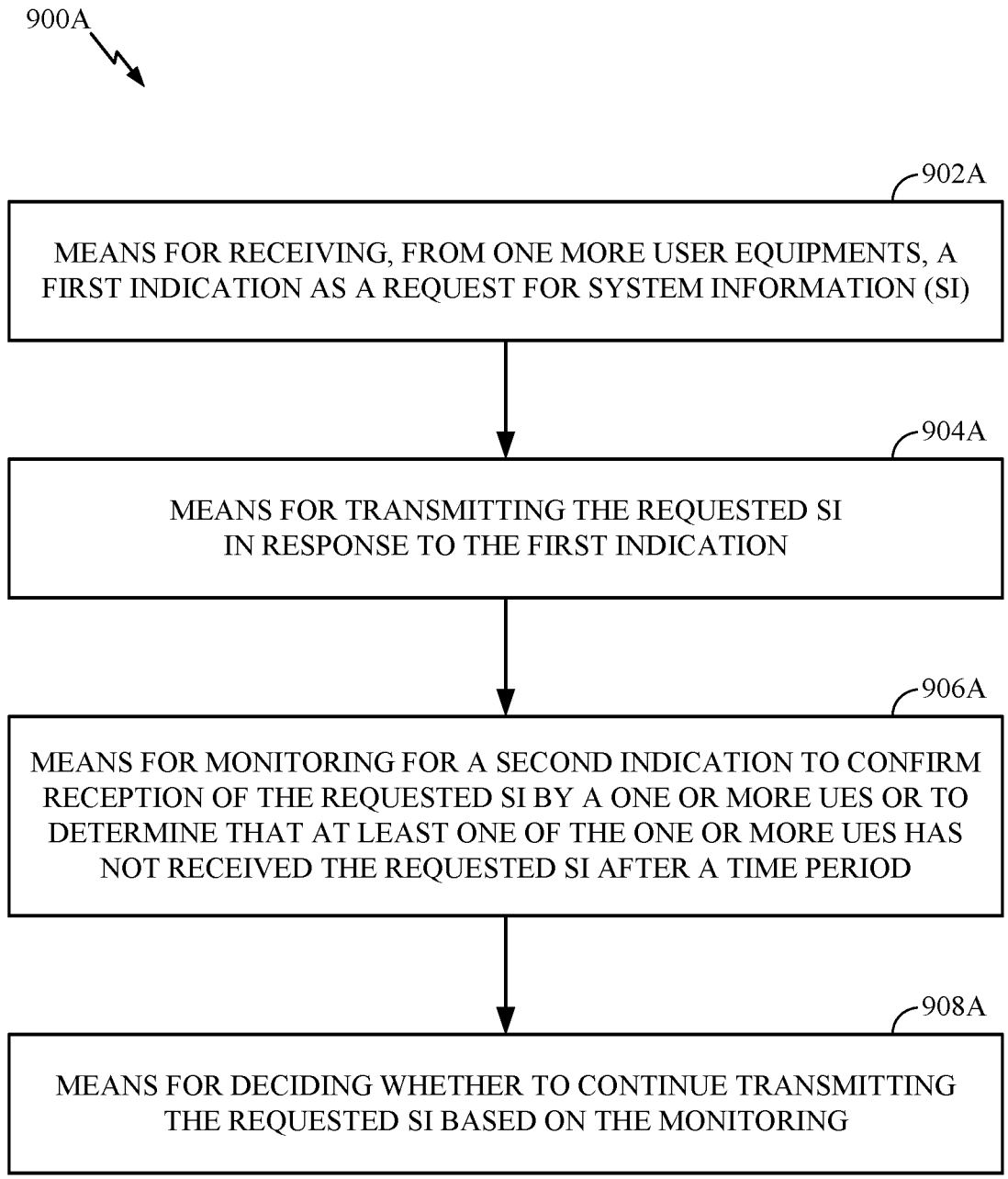
FIG. 9A illustrates example components capable of performing the operations shown in FIG. 9, in accordance with aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8, and operations 900 illustrated in FIG. 9, correspond to means 800A illustrated in FIG. 8A, means 900A illustrated in FIG. 9A, respectively.

For example, means for transmitting (or means for sending) and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for signaling, means for indicating, means for monitoring, means for deciding, means for initializing, means for decrementing, and/or means for initializing may comprise one or more processors, such as the controller/processor 440 of the base station 110 and/or the controller/processor 480 of the user equipment 120. The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), the method comprising:
receiving a minimum system information transmission, the minimum system information indicating a number of a plurality of retransmissions of a system information block (SIB) that will be transmitted by a network entity in response to a request from the UE for the SIB and indicating a time offset between when the request for the SIB is received by the network entity and when an initial transmission of the requested SIB will be transmitted;
sending a first indication to request the SIB, whrein the sending the first indication comprises sending the first indication via a dedicated random access channel (RACH) preamble or RACH transmission, and wherein, when the first indication is sent via the dedicated RACH preamble, the first indication is sent in a RACH time slot associated with the requested SIB;
monitoring, after the time offset, for the initial transmission of the requested SIB;
determining that the UE did not receive the requested SIB for a period of time corresponding to the number of the plurality of retransmissions of the requested SIB by the network entity;
refraining, during the period of time, from sending another indication to request the SIB; and
in response to the determination, sending a second indication to indicate the UE has not received the requested SIB.

2. The method of claim 1, wherein the sending the first indication is in response to a determination that the requested SIB is available on demand, is desired by the UE, and is not currently being broadcast.

3. The method of claim 1, wherein the determining that the UE did not receive the requested SIB for the period of time comprises monitoring for the requested SIB in a plurality of pre-scheduled subframes corresponding to the number of the plurality of retransmissions of the requested SIB.

4. The method of claim 1, wherein the sending the first indication comprises sending the first indication via a designated RACH message 3 transmission.

5. The method of claim 1, wherein the sending the second indication comprises sending the second indication as a negative acknowledgement (NACK) on a physical uplink control channel (PUCCH), and wherein the PUCCH includes information indicating the NACK is for the requested SIB.

6. The method of claim 5, wherein time and frequency resources for the PUCCH are configured in the minimum system information.

7. The method of claim 1, further comprising, in response to the UE receiving the requested SIB, refraining from sending a positive acknowledgement (ACK).

8. A method for wireless communications by a network entity, the method comprising:
broadcasting minimum system information transmission, the minimum system information indicating a number of a plurality of retransmissions of a system information block (SIB) that will be transmitted by the network entity in response to a request from a user equipment (UE) for the SIB and indicating a time offset between when the request for the SIB is received by the network entity and when an initial transmission of the requested SIB will be transmitted;

receiving, from one more UEs, a first indication as the request for the SIB, wherein the receiving the first indication comprises receiving the first indication via a dedicated random access channel (RACH) preamble or RACH transmission, and wherein, when the first indication is sent via the dedicated RACH preamble, the first indication is sent in a RACH time slot associated with the requested SIB;

transmitting, after the time offset, the initial transmission of the requested SIB in response to the first indication;

transmitting the plurality of retransissions of the requested SIB in response to the first indication;

monitoring for a second indication that at least one of the one or more UEs has not received the requested SIB after a time period corresponding to the number of the plurality of retransmissions of the requested SIB, wherein another indication to request the SIB is not received from the one or more UEs during the time period; and deciding whether to continue transmitting the requested SIB based on the monitoring.

9. The method of claim 8, wherein the transmitting the plurality of retransmissions of the requested SIB comprises transmitting the plurality of retransmissions of the SIB in a plurality of pre-scheduled subframes corresponding to the number of the plurality of the retransmissions of the requested SIB.

10. The method of claim 8, further comprising:
initializing a counter with the number of the plurality of the retransmissions of the requested SIB that will be transmitted by the network entity; and
decrementing the counter with each transmission of the requested SIB, wherein the deciding whether to continue transmitting the requested SIB is based on the counter.

11. The method of claim 10, wherein the deciding whether to continue transmitting the requested SIB comprises deciding to stop transmitting the requested SIB when the counter reaches zero.

12. The method of claim 10, further comprising re-initializing the counter when the network entity receives the second indication from at least one of the one or more UEs.

13. The method of claim 8, wherein the receiving the first indication comprises receiving the first indication via a designated RACH message 3 transmission.

14. The method of claim 8, wherein the monitoring the second indication comprises monitoring at least one of: a designated RACH preamble transmission, a RACH message 3transmission, or a physical uplink control channel (PUCCH) transmission including information indicating the second indication is for the requested SIB.

15. An apparatus for wireless communications, the apparatus comprising:

memory comprising computer executable code; and
one or more processors configured to, individually or collectively, execute the computer executable code and cause the apparatus to:
receive a minimum system information transmission indicating a number of a plurality of retransmissions of a system information block (SIB) that will be transmitted by a network entity in response to a request from the apparatus for the SIB and indicating a time offset between when the request for the SIB is received by the network entity and when an initial transmission of the requested SIB will be transmitted;

send a first indication to request the SIB, wherein the sending the first indication comprises sending the first indication via a dedicated random access channel (RACH) preamble or RACH transmission, and wherein, when the first indication is sent via the dedicated RACH preamble, the first indication is sent in a RACH time slot associated with the requested SIB;

monitor, after the time offset, for the initial transmission of the requested SIB;

determine that the apparatus did not receive the requested SIB for a period of time corresponding to the number of the plurality of retransmissions of the requested SIB by the network eneity;

refrain, during the period of time, from sending another indication to request the SIB; and in response to the determination, send a second indication to indicate the apparatus has not received the requested SIB.

16. The apparatus of claim 15, wherein the sending the first indication is in response to a determination that the requested SIB is available on demand, is desired by the apparatus, and is not currently being broadcast.

17. The apparatus of claim 15, wherein the determining that the apparatus did not receive the requested SIB for the period of time comprises monitoring for the requested SIB in a plurality of pre-scheduled subframes corresponding to the number of the plurality of retransmissions of the requested SIB.

18. The apparatus of claim 15, wherein the sending the first indication comprises sending the first indication via a designated RACH message 3 transmission.

19. The apparatus of claim 15, wherein the sending the second indication comprises sending the second indication as a negative acknowledgement (NACK) on a physical uplink control channel (PUCCH), and wherein the PUCCH includes information indicating the NACK is for the requested SIB.

20. The apparatus of claim 15, further comprising, in response to the apparatus receiving the requested SIB, refraining from sending a positive acknowledgement (ACK).

* * * * *